United States Patent Office 3,001,993

Patented Sept. 26, 1961

3,001,993

METHOD FOR PREPARING SECONDARY AMINOAZOLEDISULFIDES

Charles Malcolm Hendry and Earl C. Gregg, Jr., Cuyahoga Falls, Ohio, assignors to The B. F. Goodrich Company, New York, N.Y., a corporation of New York No Drawing. Filed Aug. 28, 1958, Ser. No. 757,669
7 Claims. (Cl. 260—243)

This invention relates to a new method for preparing secondary aminoazoledisulfides and more particularly pertains to the single step process for preparing substantially pure secondary aminoazoledisulfides in high yield by the reaction of a 2-mercaptoazole with a secondary amine, a 2-azolesulfenamide and a sulfur monohalide.

Previously disclosed methods for the preparation of compounds of the aminoazoledisulfide type have involved several steps and have yielded relatively impure products. The secondary aminoazoledisulfides of the present invention are useful in promoting the cure of rubber and they are particularly useful as delayed action and non-scorching accelerators. Because the efficiency of the secondary aminoazoledisulfides as rubber accelerators is largely dependent upon their purity, the relative simplicity and economy of the process of the present invention, as well as the purity of its products, makes it all the more important commercially.

The compounds which are embodied in this invention are the secondary aminoazoledisulfides which conform to the general formula

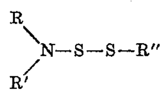

wherein R and R′ are the same or different aliphatic, alicyclic, or aralkyl groups or R and R′ together form a single chain and R″ represents a member of the group consisting of thiazoles, imidazoles, and oxazoles.

The secondary aminoazoledisulfides of the present invention are prepared by the reaction of a 2-mercaptoazole with a secondary amine, a 2-azolesulfenamide and a sulfur monohalide. Because hydrogen halide is generated during the reaction, an acid acceptor is generally used.

We have found that an excess of the secondary amine reactant will serve as the hydrogen halide acceptor as illustrated in the following reaction representative of the process of this invention wherein 2-mercaptobenzothiazole, morpholine, 2-benzothiazyl-N-morpholinyl sulfide and sulfur monochloride are allowed to react to form 2-benzothiazyl-N-morpholinyl disulfide.

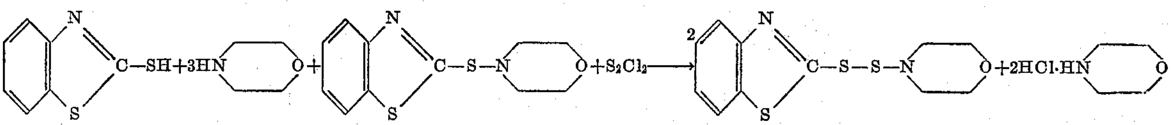

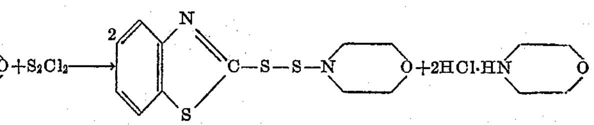

At least a two mole excess of morpholine is used to tie up the hydrogen chloride which forms during the course of the reaction.

We have also found that an inorganic base such as an alkali metal oxide, hydroxide or carbonate; an alkaline earth metal oxide, hydroxide or carbonate, as well as other aliphatic, alicyclic and heterocyclic tertiary amines can be used in place of an excess of the amine reactant to accept the hydrogen halide as is illustrated in the following scheme wherein one mole of 2-mercaptobenzothiazole, at least one mole of morpholine, one mole of 2-benzothiazyl-N-morpholinyl sulfide, one mole of sulfur monochloride and two moles of sodium hydroxide are allowed to react to form 2-benzothiazyl-N-morpholinyl disulfide.

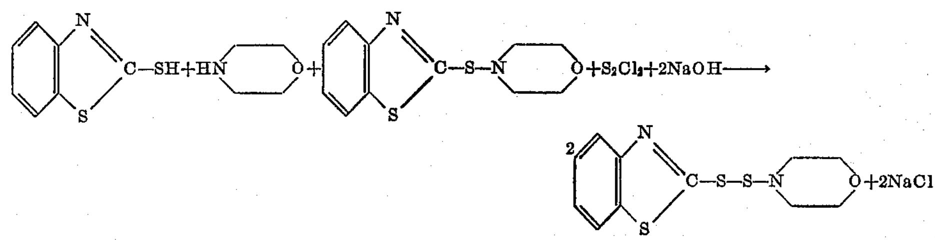

The 2-mercaptoazoles conforming to the structure R″-SH wherein R″ has the aforementioned designation which are useful in the present invention include but are not limited to the 2-mercaptothiazoles such as 2-mercaptothiazole itself, 2-mercapto-4-methylthiazole, 2-mercapto-4-ethylthiazole, 2-mercapto-4-n-propylthiazole, 2-mercapto-4-n-butylthiazole, 2-mercapto-4,5-dimethylthiazole, 2-mercapto-4,5-diethylthiazole, 2-mercapto-4,5-di-n-propylthiazole, 2-mercapto-4,5-di-n-butylthiazole, 4-phenyl-2-mercaptothiazole, 4-phenyl-5-methyl-2-mercaptothiazole, 2-mercaptobenzothiazole, 4-phenyl-2-mercaptobenzothiazole, 6-phenyl-2-mercaptobenzothiazole, 2-mercapto-tetrahydrobenzothiazole, and 2-mercaptonaphthothiazole; the 2-mercaptooxazoles such as 2-mercaptooxazole itself, 2-mercapto-4-methyloxazole, 2-mercapto-4-ethyloxazole, 2-mercapto-4-n-propyloxazole, 2-mercapto-4-n-butyloxazole, 2-mercapto-4,5-dimethyloxazole, 2-mercapto-4,5-diethyloxazole, 2-mercapto-4,5-di-n-propyloxazole, 2-mercapto-4,5-di-n-butyloxazole, 4-phenyl-2-mercaptooxazole, and 4-phenyl-5-methyloxazole; and the 2-mercaptoimidazoles such as 2-mercaptoimidazole itself, 2-mercapto-4-methylimidazole, 2-mercapto-4-ethylimidazole, 2-mercapto-4-n-propylimidazole, 2-mercapto-4-n-butylimidazole, 2-mercapto-4,5-dimethylimidazole, 2-mercapto-4,5-diethylimidazole, 2-mercapto-4,5-di-n-propylimidazole, 2-mercapto-4,5-di-n-butylimidazole, and 4-phenyl-5-methylimidazole and the like and others. The 2-mercaptobenzothiazoles are the most preferred compounds for the purpose of this invention.

The secondary amines conforming to the structure $$R(R')NH$$

wherein R and R′ have the aforementioned designations which are useful in this invention include but are not limited to the dialkyl amines such as dimethyl amine, diethyl amine, di-n-propyl amine, di-n-butyl amine, di-isobutyl amine, di-n-amyl amine, di-iso-amyl amine, di-n-hexyl amine, di-n-heptyl amine, di-cyclohexyl amine, N-methyl butyl amine, di-n-octyl amine, N-ethyl cyclohexyl amine, and di-benzyl amine; and the heterocyclic secondary amines such as morpholine, thiomorpholine, N-methyl piperazine, N-ethyl piperazine, piperidine, 5-ethyl-2-methyl piperidine and pyrrolidine. The preferred secondary amines for the purpose of this invention are the heterocyclic amines and the most preferred are morpholine and thiomorpholine.

The 2-azolesulfenamides useful in this invention are the compounds conforming to the structure

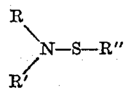

wherein R, R' and R'' have the aforementioned designations including but not limited to such compounds as 2-benzothiazyl-N-morpholinyl sulfide, 2-thiazyl-N-morpholinyl sulfide, 4,5-di-methyl-2-thiazyl-N-morpholinyl sulfide, 4-ethyl-2-thiazyl-N-thiomorpholinyl sulfide, 2-benzimidazyl-N-morpholinyl sulfide, 2-benzothiazyl-N-piperidyl sulfide, 2-benzothiazyl-N,N-dicyclohexyl sulfenamide, 2-benzothiazyl-N,N-dibenzyl sulfenamide, 2-benzothiazyl-N,N-diisopropylsulfenamide and the like and others.

The sulfur monohalides useful in this invention include sulfur monochloride, sulfur monofluoride, sulfur monobromide, and sulfur monoiodide. The preferred sulfur monohalide is sulfur monochloride.

The preferred process of this invention involves two general procedures. In the first procedure one mole of the 2-mercaptoazole and at least 3 moles of the secondary amine are dissolved in an inert organic diluent and the mixture is warmed. One mole of the 2-azolesulfenamide is then added to the mixture and the temperature of the resulting mixture is maintained at from 25° C. to about 135° C. and more preferably 30° C. to about 110° C. and one mole of the sulfur monohalide is added slowly. The completed reaction mixture is a slurry of about two moles of the amine hydrohalide suspended in the solution of secondary aminoazoledisulfide. The secondary amine hydrohalide can be separated by filtration or by extraction with water and the amine is recovered from its salt by known procedures.

In the second method one mole of 2-mercaptoazole and at least one mole of the secondary amine are dissolved in an inert organic diluent at a temperature of from about 25° C. to about 135° C., one mole of the 2-azolesulfenamide is added to the mixture followed by the slow addition of first about ½ mole of the sulfur monohalide and then slowly and simultaneously about ½ mole of the sulfur monohalide and 2 moles of an aqueous solution of an inorganic base. The reaction product is in the organic layer of the resulting two phase system. The secondary aminoazoledisulfide is readily separated in high yield and excellent purity from the organic solution resulting from either of the above general procedures by concentration, cooling and filtration.

The inert organic diluents which are useful in the present invention include aromatic hydrocarbons such as benzene, toluene and the xylenes; halogenated aromatic hydrocarbons such as chlorobenzene; nitrated aromatic hydrocarbons such as nitrobenzene; chlorinated aliphatic hydrocarbons such as chloroform; lower aliphatic esters such as ethyl acetate, ethyl propionate, methyl butyrate, propyl acetate, and the like; aliphatic cyclic ethers such as dioxane and tetrahydrofuran; and polar organic solvents such as dimethyl formamide. The preferred solvents are benzene, toluene and chloroform.

Although the procedures described above and in the examples disclose the use of an organic diluent such as benzene, toluene, chloroform and the like, it is to be understood that the process of this invention can be carried out in the absence of a diluent. The use of a diluent is preferred, however, because better temperature control can be maintained during the course of the reaction and also because of the higher purity and higher yield of secondary aminoazoledisulfide thus obtained.

The following examples are given to illustrate the process of this invention.

*Example I*

A solution of 16.7 g. of 2-mercaptobenzothiazole, 8.7 g. of morpholine and 250 ml. of benzene is stirred and held at a temperature of 60° C. and 25.2 g. of 2-benzothiazyl-N-morpholinyl sulfide is added followed by the slow addition of 6.75 g. of sulfur monochloride while the reaction temperature is held at 50–71° C. To the resulting mixture is then added simultaneously in dropwise fashion 6.75 g. of sulfur monochloride and a solution of 8 g. of sodium hydroxide in 100 ml. of water while the reaction temperature is maintained at 60–70° C. The resulting mixture is heated for 20 minutes at 70° C. and the layers are separated. The benzene layer upon concentration and cooling yields 29.1 g. of 2-benzothiazyl-N-morpholinyl disulfide having a melting point of 128–131° C. after one recrystallization from ethyl acetate. When other inorganic bases including potassium hydroxide, potassium carbonate, sodium carbonate and calcium oxide are used in place of sodium hydroxide comparable results are obtained.

*Example II*

A solution of 16.7 g. of 2-mercaptobenzothiazole and 26.1 g. of morpholine in 250 ml. of benzene is stirred at 74° C. and 25.2 g. of 2-benzothiazyl-N-morpholinyl sulfide is added to the stirred solution followed by the slow addition of 13.5 g. of sulfur monochloride. The resulting mixture is stirred at 72–74° C. for one hour and the hot slurry is passed through a filter to remove the insoluble morpholine hydrochloride. The filtrate yields, upon concentration and cooling, 40.8 g. of white, crystalline 2-benzothiazyl-N-morpholinyl disulfide (M.P. 127–130° C.). When thiomorpholine is substituted for morpholine and 2-benzothiazyl-N-thiomorpholinyl sulfide is substituted for 2-benzothiazyl-N-morpholinyl sulfide in the above procedure comparable yields of 2-benzothiazyl-N-thiomorpholinyl disulfide are obtained.

*Example III*

The procedure of Example II is followed with the exception that toluene is used as the diluent and a reaction temperature of from 96 to 115° C. is employed. A yield of 28.7 g. of crystalline 2-benzothiazyl-N-morpholinyl disulfide is obtained from the toluene.

*Example IV*

The procedure described in Example II is used with the exception that chloroform is used as the diluent and a reaction temperature of from 32–62° C. is employed. A yield of 33 g. of crystalline 2-benzothiazyl-N-morpholinyl disulfide is obtained from the chloroform.

The embodiments of the invention in which an exclusive property or privilege is claimed are defined as follows:

1. The method for preparing secondary aminothiazoledisulfides comprising reacting substantially one molar quantity of a member of the group consisting of 2-mercaptothiazole, 2-mercapto-4-methylthiazole, 2-mercapto-4-ethylthiazole, 2-mercapto-4-n-propylthiazole, 2-mercapto-4-n-butylthiazole, 2-mercapto-4,5-dimethylthiazole, 2-mercapto-4,5-diethylthiazole, 2-mercapto-4,5-di-n-propylthiazole, 2-mercapto-4,5-di-n-butylthiazole, 4-phenyl-2-mercaptothiazole, 4-phenyl-5-methyl-2-mercaptothiazole, 2-mercaptobenzothiazole, 4-phenyl-2-mercaptobenzothiazole, 6-phenyl-2-mercaptobenzothiazole, 2-mercaptotetrahydrobenzothiazole and 2-mercaptonaphthothiazole; at least one molar quantity of a secondary amine selected from the group consisting of morpholine, thiomorpholine, N-methyl piperazine, N-ethyl piperazine piperidine, 5-ethyl-2-methyl piperidine and pyrrolidine; substantially one molar quantity of a member of the group consisting of 2-benzothiazyl-N-morpholinyl sulfide, 2-thiazyl-N-morpholinyl sulfide, 4,5-dimethyl-2-thiazyl-N-morpholinyl sulfide, 4-ethyl-2-thiazyl-N-thiomorpholinyl sulfide, 2-benzimidazyl-N-morpholinyl sulfide, 2-benzothiazyl-N-piperidyl sulfide, 2-benzothiazyl-N,N-dicyclohexyl sulfenamide, 2-benzothiazyl-N,N-dibenzylsulfenamide and 2-benzothiazyl-N,N-diisopropylsulfenamide; and substantially one molar quantity of a sulfur monohalide at a temperature of from about 30° C. to about 120° C. in an inert organic diluent in the presence of substantially two equivalent weight quantities of an alkali metal hydroxide for each molar quantity of said sulfur monohalide.

2. The method for preparing secondary aminothiazole-disulfides comprising reacting substantially one molar quantity of a member of the group consisting of 2-mercaptothiazole, 2-mercapto-4-methylthiazole, 2-mercapto-4-ethylthiazole, 2-mercapto-4-n-propyl thiazole, 2-mercapto-4-n-butyl-thiazole, 2-mercapto-4,5-dimethylthiazole, 2-mercapto-4,5-diethylthiazole, 2-mercapto-4,5-di-n-propylthiazole, 2-mercapto-4,5-di-n-butylthiazole, 4-phenyl-2-mercaptothiazole, 4-phenyl-5-methyl-2-mercaptothiazole, 2-mercaptobenzothiazole, 4-phenyl-2-mercaptobenzothiazole, 6-phenyl-2-mercaptobenzothiazole, 2-mercaptotetrahydrobenzothiazole and 2-mercaptonaphthothiazole; at least three molar quantities of a secondary amine selected from the group consisting of morpholine, thiomorpholine, N-methyl piperazine, N-ethyl piperazine, piperidine, 5-ethyl-2-methyl piperidine and pyrrolidine; substantially one molar quantity of a member of the group consisting of 2-benzothiazyl-N-morpholinyl sulfide, 2-thiazyl-N-morpholinyl sulfide, 4,5-dimethyl-2-thiazyl-N-morpholinyl sulfide, 4-ethyl-2-thiazyl-N-thiomorpholinyl sulfide, 2-benzimidazyl-N-morpholinyl sulfide, 2-benzothiazyl-N-piperidyl sulfide, 2-benzothiazyl-N,N-dicyclohexyl sulfenamide, 2-benzothiazyl-N,N-dibenzylsulfenamide and 2-benzothiazyl-N,N-diisopropylsulfenamide; and substantially one molar quantity of a sulfur monohalide at a temperature of from about 30° C. to about 110° C. in an inert organic diluent.

3. The method of preparing 2-benzothiazyl-N-morpholinyl disulfide which comprises reacting substantially one mole of 2-mercaptobenzothiazole, at least 3 moles of morpholine, substantially one mole of 2-benzothiazyl-N-morpholinyl sulfide and substantially one mole of sulfur monochloride, two moles of said morpholine serving as a hydrogen chloride acceptor, at a temperature of from about 30° C. to about 120° C. in benzene.

4. The method for preparing 2-benzothiazyl-N-morpholinyl disulfide which comprises reacting substantially one mole of 2-mercaptobenzothiazole, at least 3 moles of morpholine, substantially one mole of 2-benzothiazyl-N-morpholinyl sulfide and substantially one mole of sulfur monochloride, two moles of said morpholine serving as a hydrogen chloride acceptor, at a temperature of from about 30° C. to about 120° C. in toluene.

5. The method for preparing 2-benzothiazyl-N-morpholinyl disulfide which comprises reacting substantially one mole of 2-mercaptobenzothiazole, at least 3 moles of morpholine, substantially one mole of 2-benzothiazyl-N-morpholinyl sulfide and substantially one mole of sulfur monochloride, two moles of said morpholine serving as a hydrogen chloride acceptor, at a temperature of from about 30° C. to about 120° C. in chloroform.

6. The method for preparing 2-benzothiazyl-N-morpholinyl disulfide which comprises reacting substantially one mole of 2-mercaptobenzothiazole, at least 1 mole of morpholine, substantially one mole of 2-benzothiazyl-N-morpholinyl sulfide and substantially one mole of sulfur monochloride in the presence of substantially 2 moles of aqeuous sodium hydroxide at a temperature of from about 30° C. to about 120° C. in benzene.

7. The method for preparing 2-benzothiazyl-N-thiomorpholinyl disulfide which comprises reacting substantially one mole of 2-mercaptobenzothiazole, at least 3 moles of thiomorpholine, substantially one mole of 2-benzothiazyl-N-thiomorpholinyl sulfide and substantially one mole of sulfur monochloride, two moles of said thiomorpholine serving as a hydrogen chloride acceptor, at a temperature of from about 30° C. to about 120° C. in benzene.

References Cited in the file of this patent

UNITED STATES PATENTS

| | | |
|---|---|---|
| 1,661,998 | Carson | Mar. 6, 1928 |
| 2,045,888 | Tschunkur et al. | June 30, 1936 |
| 2,259,164 | Jones | Oct. 14, 1941 |
| 2,273,321 | Jones | Feb. 17, 1942 |
| 2,510,894 | Kleiman | June 6, 1950 |
| 2,609,373 | Beaver | Sept. 2, 1952 |
| 2,713,053 | D'Amico | July 12, 1955 |
| 2,730,526 | Kinstler | Jan. 10, 1956 |
| 2,747,005 | Zerbe et al. | May 22, 1956 |
| 2,766,236 | Harmon | Oct. 9, 1956 |
| 2,779,761 | Kibler | Jan. 29, 1957 |
| 2,816,881 | Sullivan | Dec. 17, 1957 |
| 2,837,519 | Hardman | June 3, 1958 |
| 2,840,556 | Kinstler | June 24, 1958 |

FOREIGN PATENTS

| | | |
|---|---|---|
| 711,236 | Great Britain | June 30, 1954 |